US008423804B2

(12) United States Patent
Li et al.

(10) Patent No.: US 8,423,804 B2
(45) Date of Patent: Apr. 16, 2013

(54) SYSTEM AND METHOD FOR ADJUSTING SYSTEM PERFORMANCE BASED ON AN OUTPUT POWER OF A POWER ADAPTER DETERMINED ACCORDING TO AN OVER CURRENT RECOVERING TIME

(75) Inventors: Po-Yu Li, Tapei Hsien (TW); Kuan-Chi Juan, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 171 days.

(21) Appl. No.: 13/104,075

(22) Filed: May 10, 2011

(65) Prior Publication Data

US 2012/0191988 A1    Jul. 26, 2012

(30) Foreign Application Priority Data

Jan. 20, 2011   (TW) .............................. 100102153 A

(51) Int. Cl.
*G06F 1/00*  (2006.01)
*G06F 1/26*  (2006.01)
*G06F 1/32*  (2006.01)

(52) U.S. Cl.
USPC ............ 713/300; 713/320; 713/340; 345/211

(58) Field of Classification Search .................. 713/300, 713/320, 340; 345/211
See application file for complete search history.

(56) References Cited

U.S. PATENT DOCUMENTS

| 6,144,187 | A * | 11/2000 | Bryson ......................... 320/137 |
| 6,498,460 | B1 * | 12/2002 | Atkinson ...................... 320/135 |
| 7,581,130 | B2 * | 8/2009 | Carroll et al. ................. 713/340 |
| 8,103,885 | B2 * | 1/2012 | Sawyers et al. ............... 713/300 |
| 2004/0018774 | A1 * | 1/2004 | Long et al. .................... 439/620 |
| 2005/0086545 | A1 * | 4/2005 | Breen et al. ................... 713/300 |
| 2008/0151444 | A1 * | 6/2008 | Upton ............................. 361/31 |
| 2010/0106983 | A1 * | 4/2010 | Kasprzak et al. ............. 713/300 |

* cited by examiner

*Primary Examiner* — Mark Connolly
(74) *Attorney, Agent, or Firm* — Alan Kamrath; Kamrath IP Lawfirm, P.A.

(57) ABSTRACT

A method for adjusting a system performance of a portable electronic device is disclosed. The portable electronic device is connected to a power adapter for obtaining external power supply. The method comprises the steps of: receiving a voltage signal outputted from the power adapter; determining whether to execute an over current protection by the power adapter; calculating a recovering time of the voltage signal if the over current protection is executed by the power adapter, wherein the recovering time is a time period from stopping an output of the voltage signal to restarting the output thereof; and determining an output power of the power adapter to adjust the system performance of the portable electronic device according to the recovering time.

13 Claims, 5 Drawing Sheets

SYSTEM AND METHOD FOR ADJUSTING SYSTEM PERFORMANCE BASED ON AN OUTPUT POWER OF A POWER ADAPTER DETERMINED ACCORDING TO AN OVER CURRENT RECOVERING TIME

BACKGROUND OF THE INVENTION

1. Field of the Invention

The present invention relates to portable electronic devices, and more particularly, to a portable electronic device capable of determining an output power of a power adapter to which the portable electronic device is connected and adjusting the system performance of the portable electronic device, and a method for adjusting the system performance of the portable electronic device.

2. Description of the Prior Art

Due to technology development, portable electronic devices are ever-changing. To meet different user needs, portable electronic device manufacturers design portable electronic devices of different models or specifications to provide different performance or function application. Hence, portable electronic devices of different specifications may differ in rated power, which necessitates the use of a power adapter of a corresponding output power. Given the same type of products designed using the same brand, their specification varies from model to model, so does their rated power.

Assuming that a portable electronic device of a high power output, such as a notebook computer, is connected to a power adapter suitable for a low power output, the current outputted from the notebook computer exceeds the maximum current level that can be sustained by the power adapter; as a result, the power adapter executes an over current protection (OCP). To execute the over current protection, the power adapter stops outputting voltage and current temporarily so as to prevent the power adapter from being burnt due to over current, and it is only after a period of time that the power adapter restarts the output of voltage and current, so as to test the status of the notebook computer. The aforesaid period of time is known as a recovering time.

As shown in FIG. 1, to supply power to a portable electronic device through a power adapter connected thereto, the power adapter operates as follows: a power adapter not only boosts the output voltage to a stable level but also executes an over current protection (OCP) by stopping the output of voltage and thus decreasing the output voltage level to zero; after a recovering time t has passed, the power adapter restarts the output of voltage to restore a stable voltage level (in general, the recovering time t is measured in ms); and, if the power adapter still determines that overcurrent persists, the power adapter will enter the over current protection mode again. The power adapter operates in the aforesaid manner repeatedly. As a result, if a user fails to find a power adapter which matches or surpass a portable electronic device, such as a notebook computer, in an output power, the portable electronic device cannot access or receive external power supply, and the portable electronic device may even malfunction or end up with data damage, thereby causing troubles to the user.

A known way of determining the specification of the output of a power adapter involves improving a connection interface between a portable electronic device and the power adapter, disposing additional interface pins for facilitating communication and transmission of signals between the portable electronic device and the power adapter, thereby enabling the portable electronic device to determine the output specification of the power adapter. However, the aforesaid design requires re-designing the structure of the interface between the portable electronic device and the power adapter and the determination mechanism and thereby bringing inconvenience to a manufacturing process and application.

SUMMARY OF THE INVENTION

It is a primary objective of the present invention to provide a method for determining an output power of a power adapter connected to a portable electronic device and thereby adjusting the system performance of the portable electronic device accordingly.

In order to achieve the above and other objectives, the present invention provides a method for adjusting the system performance of a portable electronic device connected to a power adapter for obtaining external power supply. The method comprises the steps of: receiving a voltage signal outputted from the power adapter; determining whether to execute an over current protection by the power adapter; calculating, in response to an affirmative determination, a recovering time of the voltage signal, wherein the recovering time is a time period from stopping an output of the voltage signal to restarting the output thereof; and determining an output power of the power adapter to adjust the system performance of the portable electronic device according to the recovering time.

The portable electronic device of the present invention is for use with the aforesaid method. The portable electronic device comprises a power module and a control module. The power module is connected to the power adapter so as to obtain external power supply. The control module is electrically connected to the power module. The control module receives a voltage signal outputted from the power adapter and determines whether to execute an over current protection by the power adapter. In response to an affirmative determination, the control module calculates a recovering time of the voltage signal and determines an output power of the power adapter according to the recovering time so as to adjust the system performance of the portable electronic device.

With the aforesaid design, the present invention provides a method for adjusting the system performance of a portable electronic device and further provides the portable electronic device which can obtain external power supply through power adapters of different specifications and, after being connected to a power adapter, automatically determines an output power of the power adapter without the necessity to change the state of an interface connected therebetween, such that the system performance of the portable electronic device can be adjusted accordingly to ensure that the portable electronic device can function well despite the different output power of the power adapters.

BRIEF DESCRIPTION OF THE DRAWINGS

To enable persons skilled in the art to fully understand the objectives, technical disclosures, features, and attainable advantages of the present invention, the present invention is hereunder illustrated with specific embodiments in conjunction with the accompanying drawings, in which.

DETAILED DESCRIPTION OF THE EMBODIMENTS

Figure 1:
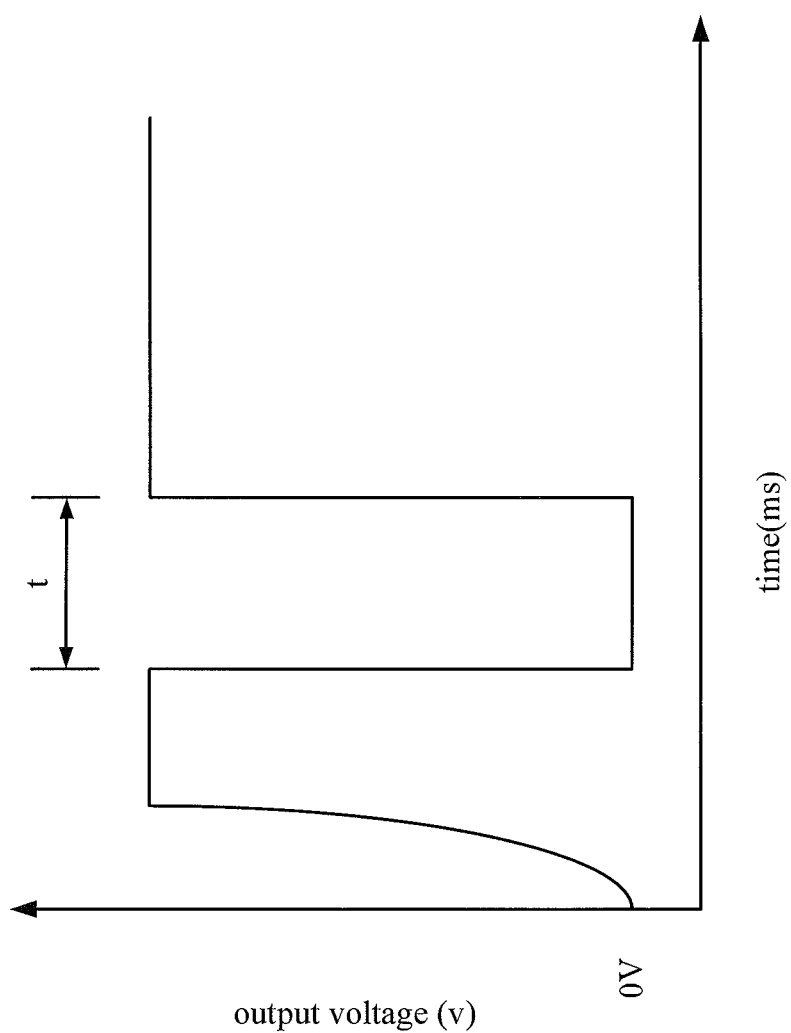
FIG. 1 is a schematic view of an output voltage of an over current protection executed by a power adapter according to the prior art.
Figure 2:
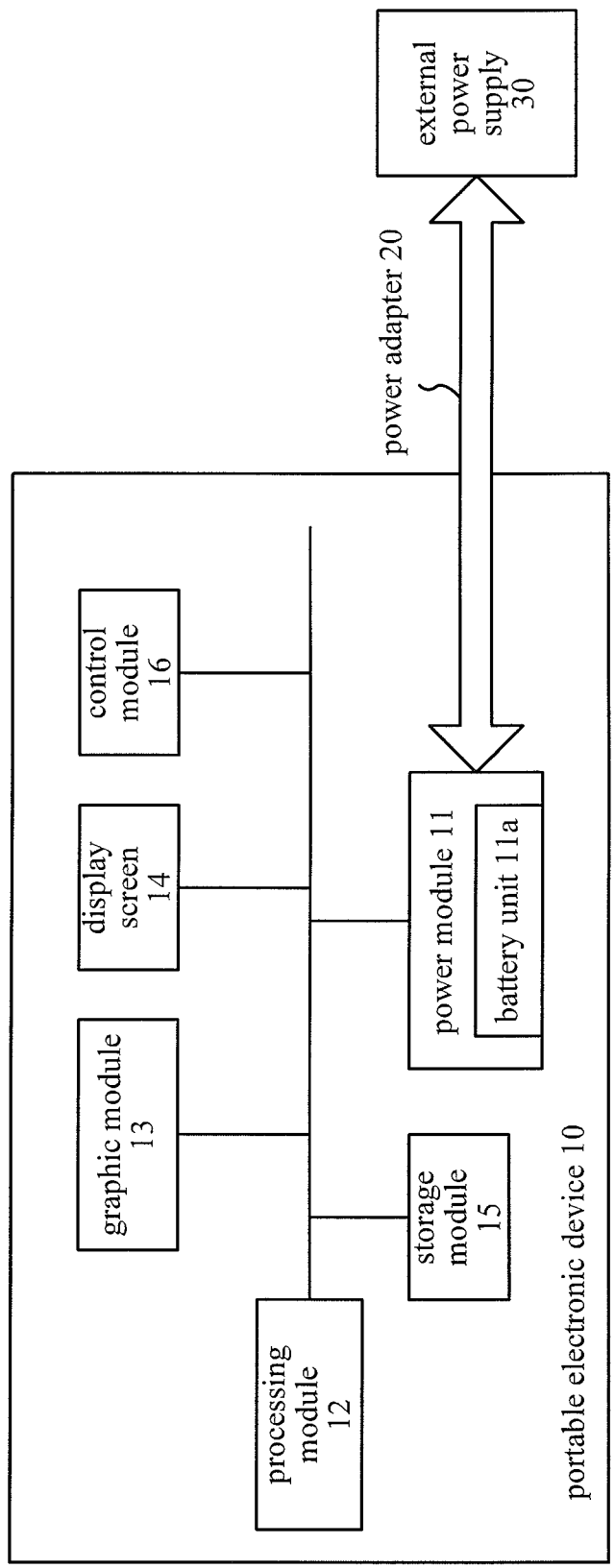
FIG. 2 is a block diagram of a portable electronic device according to the present invention.

Referring to FIG. 2, there is shown a block diagram of a portable electronic device 10 according to the present invention. The portable electronic device 10 of the present invention is any electronic device connected to a power adapter 20 for obtaining external power supply and characterized by portability. For example, the portable electronic device 10 includes, but is not limited to, a notebook computer, a panel computer, a smart cell phone, or a PDA.

As shown in FIG. 2, the portable electronic device 10 of the present invention comprises a power module 11, a processing module 12, a graphic module 13, a display screen 14, a storage module 15, and a control module 16. The modules are electrically connected to each other. The power module 11 is connected to the power adapter 20, such that the portable electronic device 10 can obtain power supply through an external power supply 30 fixed in place by being connected to the power adapter 20. The power module 11 comprises a battery unit 11a. In general, once external power supply is obtained through the power module 11, it will be feasible to charge the battery unit 11a by supplying a charging current thereto, such that the portable electronic device 10 can still be powered by the battery unit 11a and thus operated by a user even if external power supply is unavailable.

The processing module 12 computes and processes various instructions and data; in this embodiment, the processing module 12 comprises a central processing unit (CPU). The graphic module 13 performs graphic treatment on data; in this embodiment, the graphic module 13 comprises a graphic processing unit (GPU). The display screen 14 displays an image generated by the graphic module 13; in this embodiment, the display screen 14 is a liquid crystal panel, which is not restrictive of the present invention. The storage module 15 is for storing an operating system or various applications to be downloaded and executed by the processing module 12. The aforesaid elements are known and indispensable elements of the portable electronic device 10 and thus are not described hereunder for the sake of brevity.

The control module 16 is electrically connected to the power module 11. After the power adapter 20 is connected to the power module 11 and starts to supply power, the control module 16 receives a voltage signal outputted from the power adapter 20, detects the status of the voltage signal, and adjusts the system performance of the portable electronic device 10 of the present invention according to the detected status of the voltage signal. In this embodiment, the control module 16 is an embedded controller. A point to note is that the processing module 12, the graphic module 13, and the control module 16 of the portable electronic device 10 of the present invention perform their functions, respectively, in the form of hardware, software, firmware, or at least two of the above; hence, this embodiment is not restrictive of the present invention.

Figure 3:
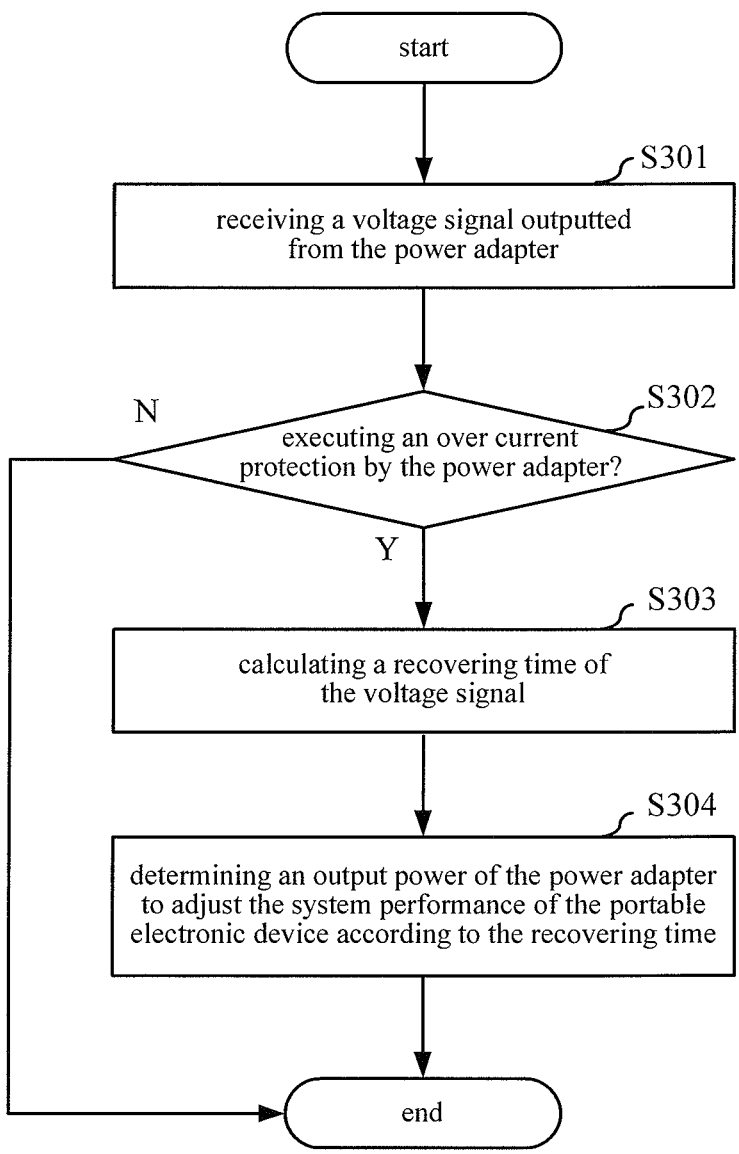
FIG. 3 is a flow chart of a method for adjusting system performance according to the present invention.

Referring to FIG. 3, there is shown a flow chart of a method for adjusting system performance according to the present invention. A point to note is that, while a method for adjusting system performance according to the present invention is illustrated with the portable electronic device 10 of a structure shown in FIG. 2, the present invention is not limited thereto.

As shown in FIG. 3, a method for adjusting system performance according to the present invention comprises step S301 through step S304. The steps of the method are described in detail below.

Step S301: receiving a voltage signal outputted from the power adapter 20. To use the external power supply 30 as the main source of power supply to the portable electronic device 10, the user connects one end of the power adapter 20 to the power module 11 of the portable electronic device 10 and connects the other end of the power adapter 20 to the external power supply 30. Once the system is started by the main switch of the portable electronic device 10, the power module 11 can obtain the external power supply through the power adapter 20, and the control module 16 can receive a voltage signal outputted from the power adapter 20 so as to detect the voltage signal in real time.

Step S302: determining whether to execute an over current protection by the power adapter 20. With the portable electronic device 10 having a rated power, an excessive current passes through the power adapter 20 whenever an output power of the power adapter 20 is less than the rated power of the portable electronic device 10; meanwhile, to execute an over current protection, the power adapter 20 stops the output of the voltage signal for a period of time until the power adapter 20 restarts the output thereof. Hence, the control module 16 detects the status of the voltage signal of the power adapter 20 to determine whether to execute an over current protection by the power adapter 20 and stop the output of the voltage signal temporarily. The aforesaid disclosure is not restrictive of the present invention. Alternatively, it is feasible to determine whether to execute an over current protection by the power adapter 20 according to a detected status of a current signal, not only because the power adapter 20 outputs a current signal to the portable electronic device 10 too, but also because the output of the current signal is temporarily stopped to enable the execution of the over current protection.

Step S303: calculating, in response to an affirmative determination, a recovering time of the voltage signal. Upon the determination that the power adapter 20 has executed the over current protection, the control module 16 calculates the recovering time of the voltage signal by detecting the time period from stopping the output of the voltage signal to restarting the output thereof; or, in other words, the control module 16 detects the point in time at which the voltage signal starts decreasing from a stable voltage level to a zero voltage level and the point in time at which the voltage signal restores its initial stable voltage level as a result of an increase from the zero voltage level and then calculates the recovering time of the voltage signal according to the difference of the two points in time.

A negative determination indicates that an output power of the power adapter 20 matches the rated power of the portable electronic device 10, or, in other words, the power adapter 20 can supply power to the portable electronic device 10 well.

Step S304: determining an output power of the power adapter 20 to adjust the system performance of the portable electronic device 10 according to the recovering time. The control module 16 stores a power matching parameter. The power matching parameter is for use in recording an output power of the power adapter 20 with different recovering time. The control module 16 compares the calculated recovering time and the stored power matching parameter to determine an output power of the power adapter 20 currently connected to the portable electronic device 10, wherein an output power of the power adapter 20, as determined according to the recovering time, is less than the rated power of the portable electronic device 10.

The power matching parameter stored in the control module 16 is preset, such that the recovering time always matches the output power regardless of any variation thereof. In doing so, the control module 16 determines the output power of the power adapter 20 in use according to the detected recovering time. In an embodiment of the present invention, assuming that the rated power of the portable electronic device 10 is 120 W, once the portable electronic device 10 is connected to the power adapter 20 of an output power of 120 W, the power adapter 20 will not execute an over current protection, nor will the recovering time be necessary. However, if the power adapter 20 to which the portable electronic device 10 is connected has an output power less than 120 W, the required recovering time will vary according to an output power of the power adapter 20.

Figure 4:
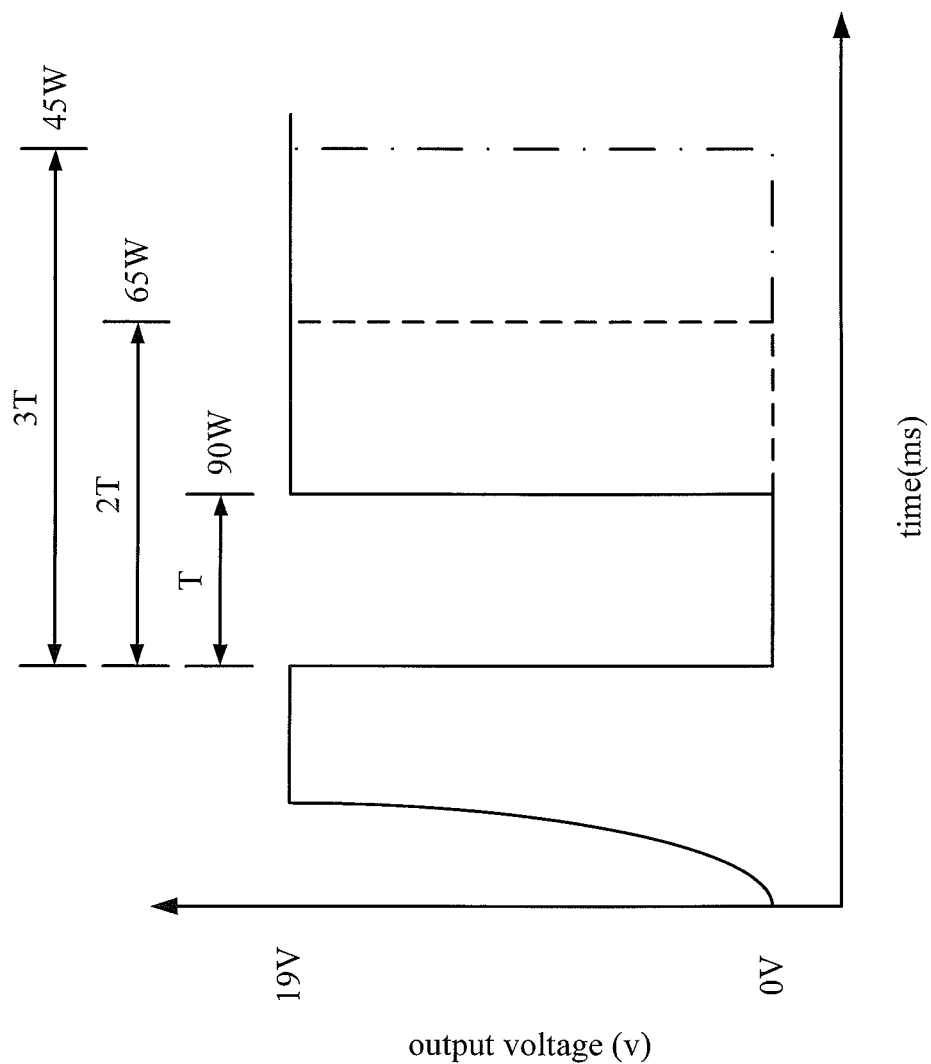
FIG. 4 is a schematic view of an output voltage of an over current protection executed by power adapters of different output power with a method for adjusting system performance according to the present invention.

Referring to FIG. 4, there is shown a schematic view of an output voltage of an over current protection executed by the power adapter 20 of different output power with a method for adjusting system performance according to the present invention. As shown in FIG. 4, the method for adjusting system performance according to the present invention is exemplified by an output power level frequently used, such as 90 W, 65 W, or 45 W, of the power adapter 20. Assuming that the power adapter 20 outputs voltage of a stable level of 19V, the recovering time of the voltage signal can be calculated according to the difference of the point in time at which the voltage signal starts to decrease from 19V to 0V and the point in time at which the voltage signal restores its initial voltage level of 19V.

Given a 90 W output power of the power adapter 20, it takes a recovering time T for the power adapter 20 to execute an over current protection. Given a 65 W output power of the power adapter 20, it takes a recovering time 2T for the power adapter 20 to execute an over current protection. Given a 45 W output power of the power adapter 20, it takes a recovering time 3T for the power adapter 20 to execute an over current protection. In other words, in this embodiment, the power adapter 20 increases its recovering time, as its output power decreases, though the disclosure is not restrictive of the present invention. Hence, once the power adapter 20 executes an over current protection, the control module 16 compares the detected recovering time and the stored power matching parameter to determine an output power of the power adapter 20.

To ensure that the portable electronic device 10 will still function well when connected to the power adapter 20 of a relatively low output power, it is an essential feature of the present invention to adjust the system performance of the portable electronic device 10 and thereby reduce the rated power of the portable electronic device 10, so as to maintain the operation status of the portable electronic device 10. The control module 16 further stores a system performance parameter. The system performance parameter is for use in recording different system performance settings corresponding to respective output power levels of power adapters. The control module 16 compares the determined output power of the power adapters and the stored system performance parameter to determine the extent of the present adjustment of the system performance of the portable electronic device 10 and send messages to corresponding elements to instruct the elements to adjust the performance thereof.

The adjusting the system performance of the portable electronic device 10, as disclosed in step S304, means adjusting the operation performance of at least one of the processing module 12, the graphic module 13, the display screen 14, and the power module 11 of the portable electronic device 10. Normally, in the portable electronic device 10, the processing module 12 (CPU), the graphic module 13 (GPU), the display screen 14, and the battery unit 11a (of the power module 11) being charged are among the elements that consume the most power. In view of this, the design of the present invention is focused on the adjustment of the performance of the aforesaid internal elements with a view to reducing power consumption. In this regard, the way of processing the clock of the processing module 12 and the graphic module 13 is adjusted to decrease their processing performance and thereby reduce their power consumption. The brightness and contrast of the display screen 14 are adjusted, so as to decrease the display performance of the display screen 14. The power module 11 stops supplying a charging current to the battery unit 11a so as to reduce additional power consumption.

Figure 5:
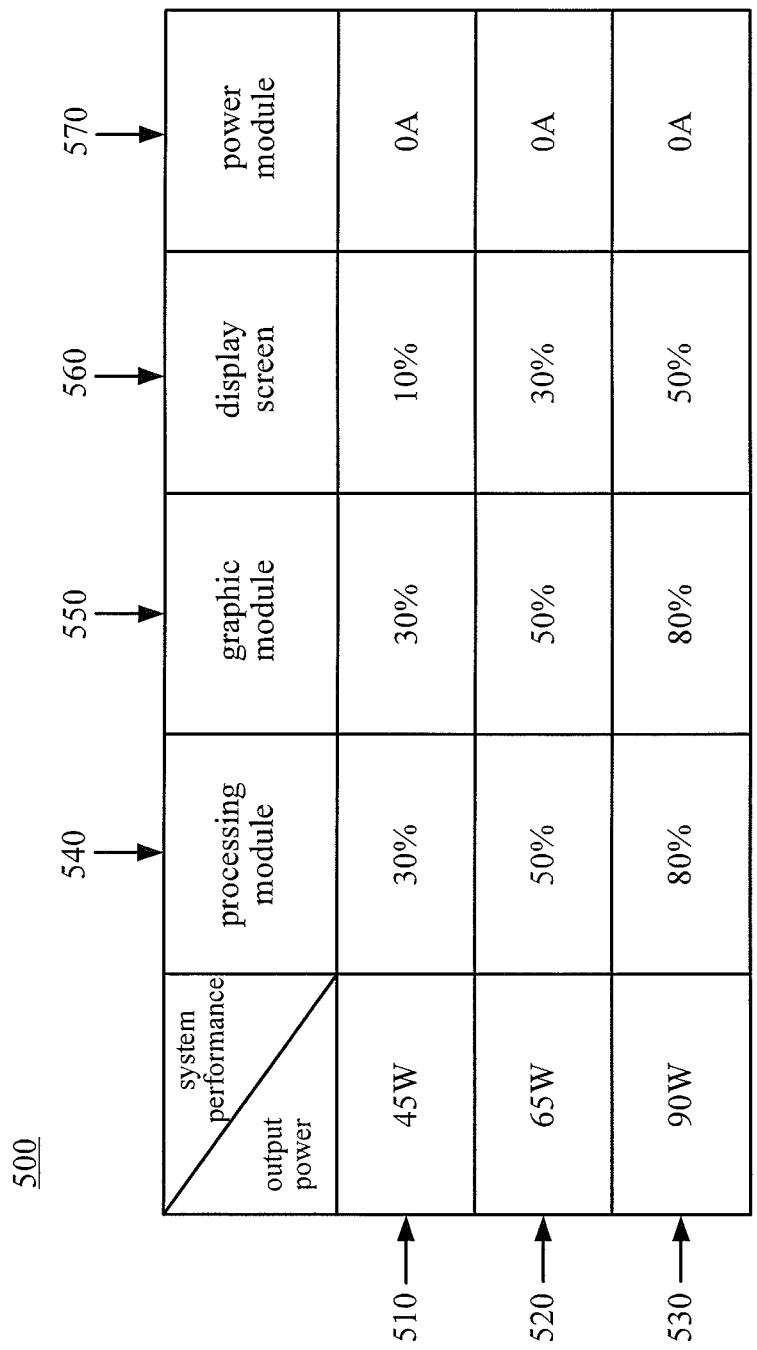
FIG. 5 is a parameter table for use in adjusting system performance according to an output power of a power adapter with a method for adjusting system performance according to an embodiment of the present invention.

Referring to FIG. 2 and FIG. 5, FIG. 5 is a parameter table for use in adjusting system performance according to an output power of the power adapter 20 with a method for adjusting system performance according to an embodiment of the present invention. In this embodiment, assuming that the portable electronic device 10 has an original rated power of 120 W, and the table shows the performance percentage ratio of an output power (such as 45 W, 65 W, or 90 W) of the power adapter 20 to an output power of 120 W. If an output power (such as 45 W, 65 W, or 90 W) of the power adapter 20 connected to the portable electronic device 10 is less than the original rated power (120 W) of the portable electronic device 10, the control module 16 will, after determining an output power of the power adapter 20, instruct corresponding elements in the portable electronic device 10 to perform related performance adjustment according to the system performance parameter.

In this embodiment, in a parameter table 500, rows 510, 520 and 530 show the operation performance percentages of the processing module 12, the graphic module 13 and the display screen 14, respectively, after the adjustment thereof has been performed under the same condition of an output power (such as 45 W, 65 W, or 90 W) of the power adapter 20. As regards the charging current of the battery unit 11a, there is variation in the extent of the adjustment of performance between different elements. In addition, it is an essential feature of the present invention to adjust the performance of a single element or part of an element, and this embodiment is not restrictive of the present invention.

Columns 540, 550 and 560 show the operation performance percentages of the processing module 12, the graphic module 13 and the display screen 14, respectively, after the adjustment thereof has been performed with respect to different output power levels (such as 45 W, 65 W, or 90 W) of the power adapter 20. The larger the output power of the power adapter 20 connected to the portable electronic device 10, the lesser the extent of the adjustment of the operation performance of individual elements in the portable electronic device 10, and the higher their operation performance. Column 570 shows that, regarding the battery unit 11a, the battery unit 11a will no longer receive a charging current, so as to reduce power consumption, provided that an output power of the power adapter 20 is less than the original rated power of the portable electronic device 10.

With the design of the present invention, a power adapter manufacturer designs a recovering time in accordance with the design of an output power in advance to enable a user to determine an output power of a power adapter regardless of the level of the output power of a power adapter for supplying power to a portable electronic device and adjust the operation performance of the portable electronic device accordingly, such that the portable electronic device keeps functioning well.

The foregoing embodiments are provided to illustrate and disclose the technical notions and features of the present invention so as to enable persons skilled in the art to understand the disclosure of the present invention and implement the present invention accordingly, and are not intended to be restrictive of the scope of the present invention. Hence, all equivalent variations or modifications made in the foregoing embodiments without departing from the spirit embodied in the disclosure of the present invention should fall within the scope of the present invention as set forth in the appended claims.

What is claimed is:

1. A method for adjusting a system performance of a portable electronic device connectable to a power adapter for obtaining external power supply, the method comprising the steps of:
   receiving a voltage signal outputted from the power adapter;
   determining whether to execute an over current protection by the power adapter;
   calculating, in response to an affirmative determination, a recovering time of the voltage signal, wherein the recovering time is a time period from stopping an output of the voltage signal to restarting the output thereof; and
   determining an output power of the power adapter to adjust the system performance of the portable electronic device according to the recovering time.

2. The method of claim 1, wherein the determination whether to execute the over current protection by the power adapter is effectuated by determining whether a current signal or the voltage signal outputted from the power adapter is outputted again after a time period of interruption of output thereof.

3. The method of claim 1, wherein different said output power levels correspond to different system performance parameters of the portable electronic device, such that the system performance is adjusted according to the system performance parameter.

4. The method of claim 1, wherein the lesser the output power, the larger an extent of adjustment of the system performance.

5. The method of claim 1, wherein the step of adjusting the system performance of the portable electronic device according to the output power comprises adjusting an operation performance of at least one of a processing module, a graphic module, a display screen, and a power module of the portable electronic device.

6. The method of claim 5, wherein a supply of a charging current to a battery unit of the power module is stopped when the system performance to be adjusted comprises a charging performance of the power module.

7. A portable electronic device, comprising:
   a power module connected to a power adapter for obtaining external power supply; and
   a control module electrically connected to the power module and adapted to receive a voltage signal outputted from the power adapter and determine whether to execute an over current protection by the power adapter, wherein, in response to an affirmative determination, the control module calculates a recovering time of the voltage signal and determines an output power of the power adapter according to the recovering time to adjust a system performance of the portable electronic device, the recovering time being a time period from stopping an output of the voltage signal to restarting the output thereof.

8. The portable electronic device of claim 7, wherein the determination whether to execute the over current protection by the power adapter is effectuated by determining whether a current signal or the voltage signal outputted from the power adapter is outputted again after a time period of interruption of output thereof.

9. The portable electronic device of claim 7, wherein the control module further comprises a system performance parameter for recording different system performance adjustment values corresponding to different said output power levels, respectively, so as to enable the control module to adjust the system performance.

10. The portable electronic device of claim 7, wherein the lesser the output power, the larger an extent of adjustment of the system performance.

11. The portable electronic device of claim 7, further comprising a processing module, a graphic module, and a display screen, wherein the control module adjusts an operation performance of at least one of the processing module, the graphic module, the display screen, and the power module according to the output power.

12. The portable electronic device of claim 11, wherein the power module comprises a battery unit, and the control module adjusts the operation performance of the power module by stopping a supply of a charging current to the battery unit.

13. The portable electronic device of claim 7, wherein the control module is an embedded controller.

* * * * *